United States Patent [19]

Martin

[11] Patent Number: 5,399,016
[45] Date of Patent: Mar. 21, 1995

[54] DEVICE AND METHOD FOR CONTINUOUSLY AND NON-DESTRUCTIVELY MONITORING VARIATION IN THE THICKNESS OF SHAPED SECTIONS

[75] Inventor: Joseph Martin, Villeurbanne, France

[73] Assignee: Institut Francais Du Petrole, Rueil-Malmaison, France

[21] Appl. No.: 78,310

[22] PCT Filed: Sep. 30, 1992

[86] PCT No.: PCT/FR92/00922

§ 371 Date: Jul. 28, 1993

§ 102(e) Date: Jul. 28, 1993

[87] PCT Pub. No.: WO93/08446

PCT Pub. Date: Apr. 29, 1993

[30] Foreign Application Priority Data

Oct. 21, 1991 [FR] France ................ 91 12989

[51] Int. Cl.$^6$ .................. G01N 25/00; G01B 11/06
[52] U.S. Cl. ........................ 374/7; 374/124; 374/141; 250/330; 250/338.1
[58] Field of Search .............. 374/4, 5, 6, 7, 124, 374/137, 141; 250/338.1, 330

[56] References Cited

U.S. PATENT DOCUMENTS

| | | | |
|---|---|---|---|
| 3,504,524 | 4/1970 | Maley | 374/5 |
| 3,535,522 | 10/1970 | Green . | |
| 3,843,290 | 10/1974 | Sender | 374/141 |
| 3,973,122 | 8/1976 | Goldberg | 374/7 |
| 4,671,674 | 6/1987 | Detronde | 374/124 |
| 4,768,158 | 8/1988 | Osanai | 374/5 |
| 4,783,647 | 11/1988 | Wood | 374/7 |
| 4,818,118 | 4/1989 | Bantel et al. | 374/7 |
| 4,826,326 | 5/1989 | Reynolds et al. | 374/5 |
| 4,854,724 | 8/1989 | Adams et al. | 374/5 |
| 4,872,762 | 10/1989 | Koshihara et al. | 374/124 |
| 4,886,370 | 12/1989 | Koshihara et al. | 374/5 |
| 4,965,451 | 10/1990 | Solter | 374/5 |
| 5,052,816 | 10/1991 | Nakamura et al. | 374/124 |

FOREIGN PATENT DOCUMENTS

| | | | |
|---|---|---|---|
| 4003407 | 8/1991 | Germany . | |
| 0124938 | 7/1983 | Japan | 374/5 |
| 0172249 | 7/1987 | Japan | 374/4 |
| 0124948 | 5/1988 | Japan | 374/5 |
| 0180441 | 7/1989 | Japan | 374/4 |
| 0214749 | 8/1989 | Japan | 374/4 |
| 0565239 | 7/1977 | U.S.S.R. | 374/5 |
| 0800614 | 1/1981 | U.S.S.R. | 374/7 |
| 0003704 | 12/1981 | WIPO | 374/7 |

OTHER PUBLICATIONS

Patent Abstracts of Japan, vol. 15, No. 95 (p. 1176) 7 Mar. 1991 & JP 2309205 (Dec. 25, 1990)(Only abstract considered).

Primary Examiner—Diego F. F. Gutierrez
Attorney, Agent, or Firm—Antonelli, Terry, Stout & Kraus

[57] ABSTRACT

A device for non-destructively and continuously measuring and monitoring the thickness of a shaped section includes an extruder for extruding a thermoplastic material to form a shaped section having a temperature variation extending along a length of said section, at least one unit for measuring and detecting radiation emitted by the section during movement of the shaped section from the extruder and at least one unit for causing the radiation detecting and measuring unit to scan the entire outer surface of the shaped section. The detecting and measuring unit being connected to a computer system including imaging processing software, a radiation recording unit and a display screen for determining a variation in the thickness of the shaped section based on a variation of emitted radiation detected by the detecting and measuring unit.

11 Claims, 1 Drawing Sheet

DEVICE AND METHOD FOR CONTINUOUSLY AND NON-DESTRUCTIVELY MONITORING VARIATION IN THE THICKNESS OF SHAPED SECTIONS

BACKGROUND OF THE INVENTION

The present invention relates to a device and to a method for non-destructively and continuously measuring and/or monitoring the thickness of a shaped section.

Many techniques allowing non-destructive and continuous measurement and/or monitoring of the thickness of a shaped section have been proposed in the past.

Utilization of a source producing ultrasounds cooperating with a detector has been proposed, the assembly allowing continuous monitoring of the thickness of the shaped section. This technique requires a contact between the shaped section and the detector, which does not favour complete monitoring of the whole surface of the section because of the limited contact surface of the receiver with respect to the surface to be monitored. Moreover, this method is practically inapplicable in case of a shaped section comprising corrugations.

Methods utilizing ionizing radiations, particularly $\beta$ radiations, have also been proposed, but in this case the detector has to be located at a fixed distance from the surface of the shaped section, which poses a technical problem that is difficult to solve in case of shaped sections comprising corrugations. Furthermore, in case $\beta$ radiations are used, radiation protection means have to be provided, which makes the process and the implementation thereof much more complicated.

SUMMARY OF THE INVENTION

The present invention proposes a method and a device for non-destructively and continuously measuring and/or monitoring the thickness of a shaped section overcoming the drawbacks of the methods from the prior art. Particularly, the method and the device according to the invention may be easily applied to corrugated shaped sections, whatever the shape and the amplitude of the corrugations. The method of the invention is based on the measurement of the radiation emitted by the section during a heating phase or a cooling phase.

Without referring to any theory, it may be considered that a material of substantially homogenous density cools down or heats up all the more rapidly as it is thin. Thus, by measuring or by observing, for example by means of an infrared camera, the radiation emitted by the shaped section during a thermal transition, i.e. during heating up or cooling down, it is possible to observe or to measure continuously thicknesses or thickness variations.

It is usually assumed that a material of substantially homogenous density emits a radiation, particularly an infrared radiation, whose power is proportionate to its surface temperature to the power of four. During a thermal transition (cooling down or heating up), the evolution of the surface temperature depends on the thickness of the shaped section. With a substantially evenly cooled or heated section, different surface temperatures, therefore radiation emissions, notably infrared radiations of various powers, correspond to each thickness variation. This phenomenon is more marked for materials having a low heat conductivity, and for which cooling or heating is generally faster than the homogenization of the temperature within the material.

The present invention therefore allows notably, but not exclusively, continuous and non-destructive monitoring, by means of an infrared camera, of the thickness of thermoplastic corrugated tubes forming for example the core of reinforced corrugated tubes.

The device for non-destructively and continuously measuring and/or monitoring the thickness of a shaped section according to the present invention utilizes this physical phenomenon.

More particularly, the device according to the invention comprises in combination:
a) at least one means for altering the temperature of said shaped section,
b) at least one means for detecting and measuring the radiation emitted by said section during said thermal transition, and
c) at least one means allowing said radiation detecting and measuring means to scan the whole section surface to be monitored.

In a preferred embodiment of the invention, the radiation detecting and measuring means is connected to a means for recording the measurement of this radiation.

Most often, the radiation detecting and measuring means comprises an infrared camera connected to a display screen and/or to a computer system including an image processing software. The computer system preferably comprises a means for storing the images supplied by the infrared camera and/or the results provided by the image processing software.

According to a preferred embodiment of the present invention, the device comprises at least one means allowing forward motion of the shaped section, for example caterpillar tracks, and at least one means allowing synchronization of this forward motion with the scanning motion of the radiation detecting and measuring means, so that the whole surface of the section is scanned by said detecting and measuring means.

The device of the present invention may be used for non-destructively and continuously measuring and/or monitoring the thickness of a shaped section during the manufacturing thereof. In this case, the means for heating the section consists of an apparatus for shaping said section. This shaping apparatus may be, for example, an extruder, a die of a pultrusion machine or any other apparatus known by the man skilled in the art.

The device according to the present invention may be used for non-destructively and continuously measuring and/or monitoring the thickness of a shaped section before its utilization, for example during the manufacturing thereof, and also after its manufacturing or in a site distant from its manufacturing place. In this case, the means for heating or reheating said section is usually selected from the group consisting of electric resistors, warm gaseous or liquid fluids and radiation heat sources (for example banks of infrared lamps). Heating may be obtained for example through the circulation of a warm fluid, such as for example air, water, a mineral or an organic oil, around said shaped section or, in case of a section having the shape of a tube, inside the section.

The shaped section is most often heated up so that its temperature is at least 50° C. more than the ambient temperature in the zone located at the level of the radiation detecting and measuring means. The maximum heating temperature depends on the material or materials constituting said section: it is most often at the most equal to the shaping temperature of the section, for example to the temperature of extrusion of the thermoplastic material used, which ranges most often from about 160° C. to about 280° C.

The position of the radiation detecting and measuring means with respect to that of the heating means depends both on the material constituting the shaped section, on the temperature up to which it is heated and on its mean thickness. This detecting and measuring means is preferably positioned at a point where the temperature of said section ranges from about 50° C. to about 140° C. The distance between this means and the shaped section itself is not critical and may be easily chosen by the man skilled in the art as a function of the features of this detecting and measuring means, and notably as a function of its detection sensitivity.

In case of a continuous monitoring of the thickness of a shaped section, it is often advisable to provide at least one alarm means going off automatically when the thickness of the section is, at least at one point, outside a predetermined thickness range. Such an alarm system may for example be piloted by the computer system whose image processing software may allow, after calibration, the temperatures measured to be converted into thicknesses. It is thus possible to fix one or several alarm thresholds or levels. It may for example be envisaged to fix an alarm threshold for a thickness higher than a predetermined value and an alarm threshold for a thickness lower than a predetermined value, or to select a single alarm threshold for example for a thickness lower than a predetermined value.

The means allowing the detecting and measuring means to scan the whole surface of the shaped section may include a guiding system such as, for example, a rail on which said detecting and measuring means may be fastened so as to be mobile.

The object of the present invention is also to provide a method for non-destructively and continuously measuring and/or monitoring the thickness of a shaped section, comprising in combination : generating a variation in the temperature of said section until a sufficient temperature is reached so that said section emits a radiation, and detecting and measuring, on the whole surface of said section, the radiation emitted by said section. In a preferred embodiment, said shaped section is heated up to such a temperature that it emits an infrared radiation having a wavelength substantially ranging between 2 and 25 micrometers and preferably ranging between 2 and 5 micrometers.

Most often, the method of the present invention comprises recording the radiation emitted by the shaped section, displaying and/or processing it by means of a computer system including an image processing software.

In a particular embodiment, the method of the invention comprises forward motion of the section and recording of the radiation emitted through a synchronized scanning of the whole surface of the section by the radiation detector.

In case of a continuous monitoring of the thickness of a section, it is advisable to use an alarm set off automatically by the computer system when the measured thickness of the section is, at least at one point, outside a predetermined thickness range.

The monitoring and/or measuring method according to the present invention may be particularly applied to the monitoring of shaped sections made of thermoplastic materials, such as those made of polyethylene (PE), polypropylene (PP), polyamide (PA), polyvinyl chloride (PVC), polyvinylidene fluoride (PVDF) and polydiol terephthalate such as ethylene glycol or 1,4-butanediol. These thermoplastic materials may be or not be reinforced with fibers such as, for example, glass fibers, carbon fibers, or aromatic polyamides such as, for example, Kevlar (registered trademark). These materials all have a relatively low heat conductivity and a high emissivity, notably in the wavelength range corresponding to the infrared.

The present method may be applied to the monitoring and the measurement of the thickness of flat or tubular shaped sections having a substantially circular, oval, elliptic, rectangular section or any other shape defined by a closed curve. It is particularly well suited for monitoring or for measuring the thickness of tubes or of corrugated plates. The corrugations may exhibit any shape and have a very variable amplitude. These corrugations are for example corrugations of sinusoidal, square or rectangular section.

Shaped sections usually have a mean thickness ranging from about 0.1 millimeter to about 20 millimeters, and most often ranging from about 0.2 millimeter to about 10 millimeters.

BRIEF DESCRIPTION OF THE DRAWINGS

The device of the present invention is illustrated by way of non limitative examples by the diagram in FIG. 1.

DESCRIPTION OF THE PREFERRED EMBODIMENT

Figure 1:
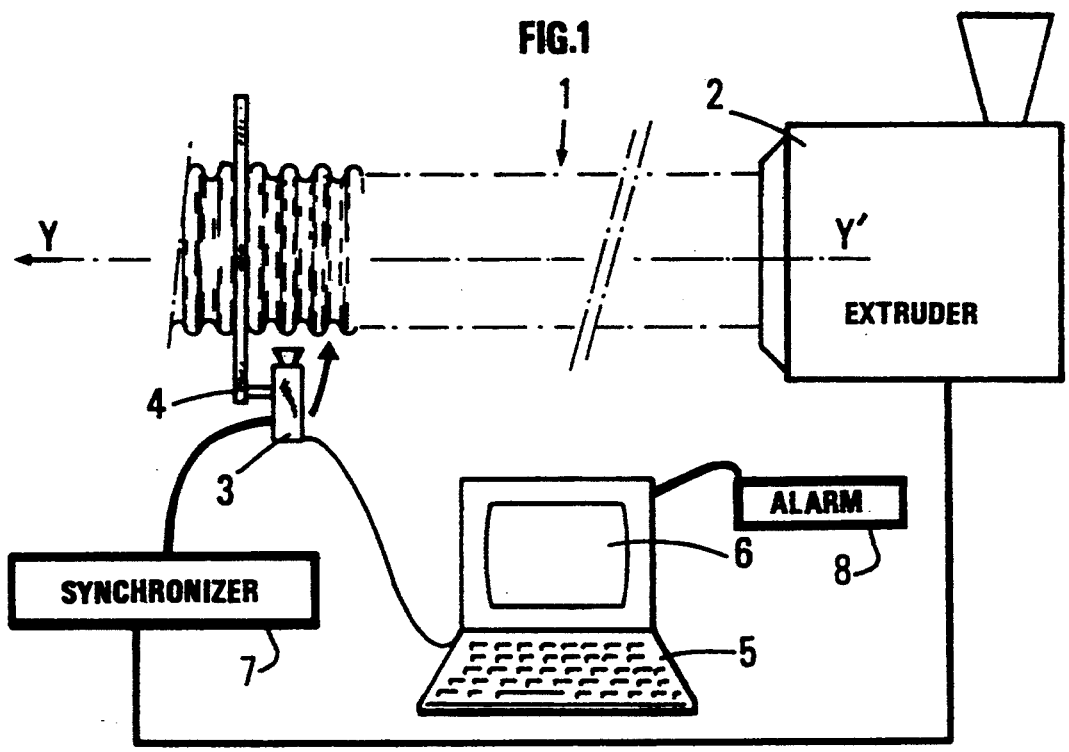

The device according to the invention, shown diagrammatically in FIG. 1, comprises an extrusion apparatus 2 allowing continuous extrusion of a tube 1, for example of a substantially circular section and having corrugations of sinusoidal section. As it has already been stated above, the heating means 2 is, in this case, the extrusion apparatus itself.

The tube moves along its longitudinal axis YY', for example at a substantially constant speed, and its surface is scanned by an infrared camera 3 located on a mobile carriage moving simultaneously on a rail 4 perpendicular to the axis YY' of the tube while rotating about the entire outer surface of the tube. The infrared camera is connected to a computer system 5 including a display screen 6. A synchronizer 7 allows synchronization of the forward motion of the tube along the YY' axis with the scanning motion of the infrared camera 3 around the entire outer surface of the tube. An alarm 8 is set off automatically by the computer system 5 when the measured thickness of the tube is, at least at one point, outside a predetermined thickness range.

Figure 2:
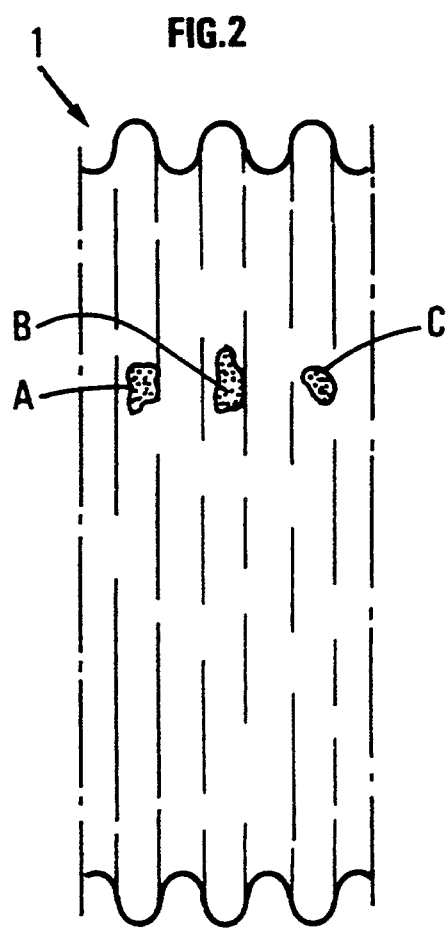
FIG. 2 is a simplified view of a corrugated tube.

FIG. 2 shows the monitoring of the thickness of a PVDF tube having a mean thickness equal to 1 millimeter. The device used for performing this monitoring is that schematized in FIG. 1. The infrared camera used may be a camera known in the art, for example of the THERMOVISION registered trademark marketed by the French company AGEMA; this camera is cooled with liquid nitrogen and has a spectral band of 2 to 5 micrometers. The associated computer system may be a system marketed by the AGEMA company, referenced TIC-8000, including a computer IBM PC-AT and a program such as CATS-E developed by the AGEMA company for the purpose of thermal analyses. The screen printing shown in FIG. 2 is achieved by means of an ink-jet printer known in the art.

The invention thus consists in scanning the whole surface of the shaped section to be examined by means of an infrared camera 3, the section being then in a thermal transition, i.e. either in a heating period, or in a cooling period, in any case emitting a radiation capable of being detected by said camera.

The computer system associated with the infrared camera 3 includes notably a means for recording the radiation emitted, a means for storing the images supplied by the camera, a means for processing said images, a means for storing the results provided by the image processing means.

Thus, according to the invention, each thickness variation is translated into the appearance of a spot on the image of the shaped section displayed on the screen, a spot corresponding to a colour variation or to a grey level variation for black and white screens. FIG. 2 shows a simplified screen display in which three spots A, B, C corresponding respectively to three defects may be seen.

Of course, the device and the method which have been described by way of non limitative examples may be provided with any addition and/or modification by the man skilled in the art.

I claim:

1. A device for non-destructively and continuously measuring and monitoring a variation in the thickness of a shaped section made of a thermoplastic material, which comprises:
   a) an extruder means for extruding the thermoplastic material to form the shaped section, said extruder means heating the thermoplastic material to generate a thermal variation within the shaped section moving continuously from the extruder means;
   b) at least one means for detecting and measuring energy radiation emitted by the heated shaped section during movement of said section from the extruder means;
   c) at least one means for causing said radiation detecting and measuring means to move around the shaped section to scan the entire outer surface of the section and to thereby determine variation in the radiation emitted from the surface of the shaped section; and
   d) means operatively associated with the radiation detecting and measuring means for determining the thickness of the shaped section based on the variation in the radiation emitted from the surface of the shaped section.

2. A device as claimed in claim 1, further comprising means for recording the radiation emitted from the shaped section, said recording means being connected to said detecting and measuring means.

3. A device as claimed in claim 2, wherein the radiation detecting and measuring means includes an infrared camera connected to at least one display screen and a computer system including an image processing software.

4. A device as claimed in claim 3, wherein the computer system includes a means for storing at least one of the images supplied by the infrared camera and the results provided by the image processing software.

5. A device as claimed in claim 1, wherein the extruder means provides forward movement of the shaped section away from an outlet of the extruder means; said device further comprising at least one means allowing synchronization of this said forward motion with a scanning motion of the radiation detecting and measuring means around the shaped section.

6. A device as claimed in claim 1, further comprising at least one alarm means which is actuated automatically when a measured thickness of the shaped section is at least at one point, outside a predetermined thickness range.

7. A method for non-destructively and continuously measuring and monitoring the thickness of a shaped section made of a thermoplastic material, which comprises:
   extruding the thermoplastic material to form the shaped section, the shaped section having a variation in temperature along a length of the shaped section moving continuously from the extruder means; and
   detecting and measuring on the entire outer surface of said shaped section, a variation of energy radiation emitted by said section whereby the thickness of the shaped section is determined based on the variation of the detected radiation emitted from said shaped section.

8. A method as claimed in claim 7, wherein the shaped section is heated in the extruder means to such a temperature that it emits infrared radiation having a wavelength substantially ranging between 2 and 25 micrometers.

9. A method as claimed in claim 8, further comprising recording the infrared radiation emitted by the shaped section, and displaying and processing the radiation by means of a computer system including an image processing software.

10. A method as claimed in claim 9 further including the step of automatically actuating an alarm by the computer system when a measured thickness of the shaped section is, at least at one point, outside a predetermined thickness range.

11. A method as claimed in claim 8, further comprising recording the infrared radiation emitted during forward movement of the shaped section through synchronized scanning of the entire outer surface of the shaped section by the radiation detector moving around the shaped section.

* * * * *